(12) United States Patent
Vandenberg

(10) Patent No.: US 7,021,835 B1
(45) Date of Patent: Apr. 4, 2006

(54) ALIGNMENT OF OPTICAL COMPONENTS IN AN OPTICAL SUBASSEMBLY

(76) Inventor: Joseph John Vandenberg, 415 N. Lark Ellen Ave., West Covina, CA (US) 91791

( * ) Notice: Subject to any disclaimer, the term of this patent is extended or adjusted under 35 U.S.C. 154(b) by 84 days.

(21) Appl. No.: 10/719,592

(22) Filed: Nov. 21, 2003

Related U.S. Application Data

(60) Provisional application No. 60/428,174, filed on Nov. 21, 2002.

(51) Int. Cl.
*G02B 6/42* (2006.01)

(52) U.S. Cl. .......................................... 385/88; 385/38

(58) Field of Classification Search .................. 385/38, 385/88–94

See application file for complete search history.

(56) References Cited

U.S. PATENT DOCUMENTS

| | | | |
|---|---|---|---|
| 5,537,502 A * | 7/1996 | Patel et al. ..................... | 385/92 |
| 6,345,138 B1 * | 2/2002 | Kawai et al. .................. | 385/49 |
| 6,713,862 B1 * | 3/2004 | Palanisamy et al. ........ | 257/703 |

* cited by examiner

*Primary Examiner*—Akim Enayet Ullah
*Assistant Examiner*—Jerry T. Rahill
(74) *Attorney, Agent, or Firm*—Parsons & Goltry; Robert A. Parsons; Michael W. Goltry

(57) ABSTRACT

Optical alignment apparatus is disclosed that includes a heatsink positioned on a supporting substrate and a laser positioned on the heat sink. The laser defines a light emitting axis substantially parallel to the surface of the supporting substrate. A conductive layer is formed on the surface of the supporting substrate adjacent the heat sink and a dielectric layer is formed on the conductive layer. The conductive layer and the dielectric layer define a selected bondline thickness. An optical block is fixedly mounted on the dielectric layer so as to receive light along an optical axis substantially parallel with the surface of the supporting substrate. The bondline thickness is selected to align the optical axis of the optical block with the optical axis of the light generating component.

20 Claims, 1 Drawing Sheet

ALIGNMENT OF OPTICAL COMPONENTS IN AN OPTICAL SUBASSEMBLY

CROSS-REFERENCE TO RELATED APPLICATIONS

This application claims the benefit of U.S. Provisional Application No. 60/428,174, filed 21 Nov. 2002.

FIELD OF THE INVENTION

This invention relates to optoelectronic packaging and, more particularly, to the stable alignment of optical components.

BACKGROUND OF THE INVENTION

Optoelectronics is a rapidly expanding technology that plays an increasingly important role in many aspects of modern society (e.g., communication over optical fibers, computer storage and displays, etc.). With the increasing number of actual and potential commercial applications for optoelectronic systems, there is a need to develop cost effective and precise manufacturing techniques for assembling optoelectronic modules (e.g., fiber-optic cable repeaters, transmitters, receivers, etc.).

One of the problems associated with developing such cost effective manufacturing techniques is the high precision required to align components (e.g., lasers, photodiodes, optical fibers, etc.) to assure proper optical coupling and durability. Typically, an optoelectronic module includes a package or housing containing an optoelectronic device (e.g., semiconductor laser, light emitting diode, photodiode, etc.) coupled to an optical fiber (e.g., single mode, multi-mode or polarization maintaining) that extends from the package. A major challenge in assembling such optoelectronic modules is in maintaining optimal alignment of the optoelectronic device with the optical fiber to maximize the optical coupling. In order to obtain maximum optical coupling, it is typically desired that the core-center of the optical fiber be precisely aligned with that of the optoelectronic device. In some cases, such as with a single-mode optical fiber, the alignment between the optoelectronic device (e.g., a laser) and the optical fiber must be within tolerances of 1 μm or less.

A conventional method for aligning an optoelectronic laser with an optical fiber is known as "active alignment," where the laser is bonded to a substrate and one end of a desired type of optical fiber is positioned in close proximity to a light-emitting surface of the laser in order to transmit light emitted from the laser through the optical fiber. A photodetector, such as a large area photodetector, is positioned at the opposing end of the fiber to collect and detect the amount of light (optical radiation) coupled to and transmitted through the fiber. The position of the fiber is incrementally adjusted relative to the laser either manually or using a machine until the light transmitted through the fiber reaches a maximum, at which time, the optical fiber is permanently bonded to the same substrate that the laser was previously bonded to.

An optoelectronic photodiode, such as a PIN or APD photodiode, may similarly be coupled to an optical fiber through "active alignment" by bonding the photodiode to a substrate and positioning the end of the optical fiber that is to be coupled to the photodiode in proximity to the light receiving surface of the photodiode. Light is then radiated through the opposing end of the optical fiber using a light source and the position of the fiber is incrementally adjusted relative the photodiode until the photodiode's electrical response reaches a maximum, wherein the optical fiber is then bonded to the substrate supporting the photodiode.

Alternatively, such "active alignment" of an optoelectronic device (e.g., laser or photodiode) to an optical fiber has been attempted by initially bonding the optical fiber to the substrate, moving the optoelectronic device into alignment by detecting the maximum optical radiation through the fiber, and then bonding the aligned optoelectronic device to the substrate supporting the fiber. However, either alignment process is labor intensive and very time consuming and, therefore, very expensive.

More recently, a new optoelectronic device bonding technique known as "self-alignment" based upon solder bump flip-chip technology has been employed to reduce die bonding accuracies from tens of micrometers toward a few micrometers. In this "self-alignment" process, small (approximately 75 μm diameter) solder bumps are placed around the periphery of the optoelectronic device. These solder bumps serve to "self-align" the device (e.g., through surface tension) as the solder is heated to a molten state and during reflow of the solder.

When coupling light between optical fibers or waveguides and optoelectronic devices, the self-alignment process eliminates the need for actively adjusting the position of the device relative to the fiber or waveguide when the solder is molten. This self-alignment process, however, has only been successfully used to assemble optoelectronic modules where the optical/mechanical tolerances are fairly loose (e.g., approximately 10 μm) and has not yet been shown to be production-worthy in single mode optoelectronic circuits where a few micrometer bonding accuracy is considered too coarse, leaving the highly labor-intensive and time-consuming active alignment method as the only production-worthy alternative.

It would be highly advantageous, therefore, to remedy the foregoing and other deficiencies inherent in the prior art.

Accordingly, it is an object the present invention to provide new and improved alignment apparatus and methods for optical components in an optical subassembly.

Another object of the present invention is to provide new and improved alignment apparatus and methods for optical components that require less labor and time in the manufacture of optical subassemblies.

Another object of the present invention is to provide new and improved alignment apparatus and methods for optical components that improve the fabrication efficiency and manufacturing capabilities of optoelectronic modules and packages.

Another object of the present invention is to provide new and improved alignment apparatus and methods for optical components that stabilize the alignment over wide temperature variations.

SUMMARY OF THE INVENTION

Briefly, to achieve the desired objects of the instant invention in accordance with a preferred embodiment thereof, optical alignment apparatus is provided. The apparatus includes a supporting substrate having a component mounting surface and thermally conductive material positioned on a first area of the component mounting surface of the supporting substrate. An optoelectronic component is positioned on the thermally conductive material, the optoelectronic component defining an optical axis substantially parallel to the component mounting surface of the supporting substrate. A conductive layer is positioned on the component mounting surface of the supporting substrate adjacent the thermally conductive material and a dielectric layer is formed on the conductive layer. The conductive layer and the dielectric layer define a selected bondline thickness. An optical block is fixedly positioned on the dielectric layer. The optical block defines an optical axis substantially parallel with the component mounting surface of the supporting substrate and the bondline thickness is selected to align the optical axis of the optical block with the optical axis of the optoelectronic component. The dielectric layer has a coefficient of thermal expansion that substantially matches the optical block and/or the supporting substrate to stabilize the alignment over wide temperature variations.

To further achieve the desired objects of the instant invention a method of mounting and aligning optical components is included. The method includes the steps of providing a supporting substrate having a component mounting surface and positioning a thermally conductive material on a first area of the component mounting surface of the supporting substrate. The method further includes a step of positioning a light generating component on the thermally conductive material. The light generating component defines a light emitting axis along which generated light is emitted and the light emitting axis is positioned substantially parallel to the component mounting surface of the supporting substrate. The method further includes a step of forming a conductive layer on the component mounting surface of the supporting substrate adjacent the thermally conductive material and forming a dielectric layer on the conductive layer. The conductive layer and the dielectric layer define a selected bondline thickness. An optical block is provided defining a light receiving axis along which light enters the optical block. The method includes a step of fixedly positioning the optical block on the dielectric layer with the light receiving axis substantially parallel with the component mounting surface of the supporting substrate. The method further includes a step of selecting the bondline thickness to align the light receiving axis of the optical block with the light emitting axis of the light generating component.

BRIEF DESCRIPTION OF THE DRAWING

The foregoing and further and more specific objects and advantages of the instant invention will become readily apparent to those skilled in the art from the following detailed description of a preferred embodiment thereof taken in conjunction with the single drawing in which a sectional view of an optoelectronic subassembly in accordance with the present invention is illustrated.

DETAILED DESCRIPTION OF THE DRAWING

Figure 1:
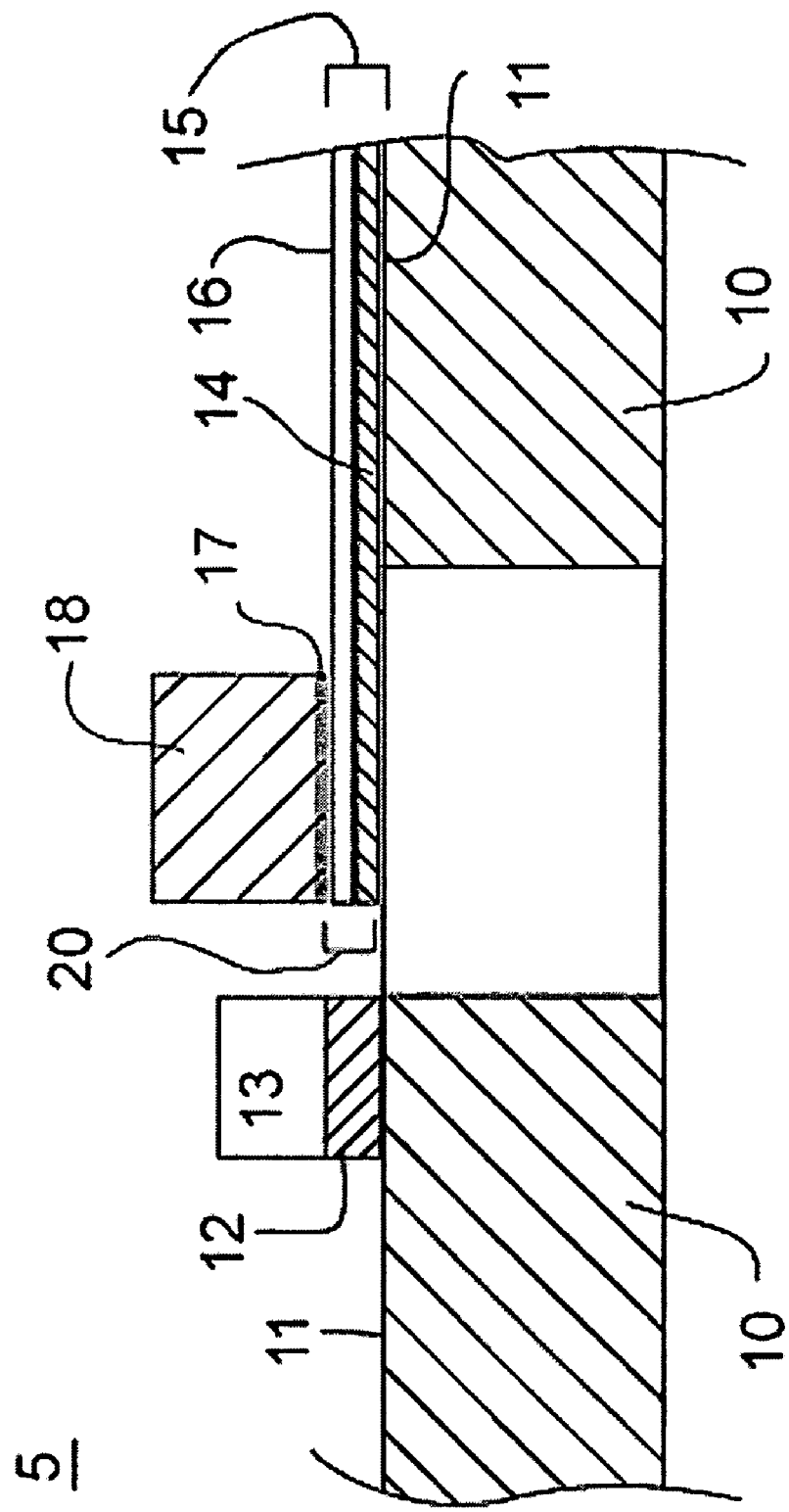

Turning to the single FIGURE, an optoelectronic package 5 in accordance with the present invention is illustrated. Optoelectronic package 5 includes a supporting substrate 10 with a surface 11. In the preferred embodiment, substrate 10 includes a ceramic material layer. However, it will be understood that substrate 10 can include other suitable materials, such as a semiconductor, an insulator, a conductor, or the like. Further, substrate 10 is illustrated as including a single ceramic material layer for simplicity. It will be understood, however, that substrate 10 can include more than one layer. Further, it will be understood that substrate 10 can include other electronic or optoelectronic devices or circuitry.

Optoelectronic package 5 includes a heatsink 12 positioned on surface 11. It will be understood that heatsink 12 can be any convenient thermally conductive material and is characterized herein as a "heatsink" only for purposes of explanation. An optoelectronic device, in this explanation a laser device 13, is positioned on heatsink 12. It will be understood that the optoelectronic device can include other light emitting devices, such as a light emitting diode or the like. However, laser 13 positioned on heatsink 12 is a preferred embodiment and is illustrated herein as an example of the present alignment apparatus and procedure. Laser 13 is positioned so that light generated therein is emitted along an optical or light axis substantially (e.g. within manufacturing tolerances) parallel with surface 11.

A material region 20 with a coefficient of thermal expansion and a bondline thickness 15 is positioned on a portion of surface 11 adjacent heatsink 12. Material region 20 includes a conductive layer 14 which includes, for example, gold (Au) and is positioned on surface 11. However, it will be understood that conductive layer 14 can include other conductive materials, such as platinum (Pt), silver (Ag), or the like.

Material region 20 also includes a dielectric layer 16, for example silicon oxide (SiO), positioned on conductive layer 14. However, it will be understood that dielectric layer 16 can include other insulating materials, such as aluminum oxide (AlO), aluminum nitride (AlN), or the like. It will be further understood that material region 20 is illustrated as including two layers 14 and 16 for simplicity and ease of discussion. However, material region 20 can include any number of layers greater than or equal to one.

An optical block 18 is positioned on dielectric layer 16. Optical block 18 is defined herein as representing or including, for example, an optoelectronic device (e.g. a photodetector, a laser, etc.), the end of an optical fiber, an optical component (e.g. a lens, mirror, etc.) or the like, wherein it is desirable to align and optically couple optical block 18 with laser 13. In the preferred embodiment, optical block 18 is fixedly attached to dielectric layer 16 by using an epoxy layer 17. However, it will be understood that optical block 18 can be fixedly attached to dielectric layer 16 using any convenient adhesive, solder, or the like. Optical block 18 has a light receiving or input area defining an optical axis that is substantially (e.g. within manufacturing tolerances) parallel with surface 11.

Dielectric layer 16 is used to adjust the height of block 18 relative to laser 13 to compensate for any height differential between optical block 18 and laser 13 (i.e. optically align the optical axes of optical block 18 and laser 13). Further, by including dielectric layer 16 between conductive layer 14 and optical block 18, the coefficient of thermal expansion of material region 20 is significantly reduced. That is, the coefficients of thermal expansion between optical block 18 and material region 20 can be more closely matched. The reduction or matching of the coefficient of thermal expansion of material region 20 improves the optical alignment properties of laser 13 with optical block 18 and stabilizes the alignment over a wider range of temperatures. Additionally, dielectric layer 16 improves the adhesion between optical block 18 (using epoxy layer 17) and conductive layer 14 as compared to adhering optical block 18 (using epoxy layer 17) directly to conductive layer 14.

Thus, a conductive layer can be provided on the surface of any desired supporting substrate using any convenient technique and a dielectric layer of a desired thickness is formed on the conductive layer. Here it will be understood by those skilled in the art that the conductive layer and/or the dielectric layer can be conveniently formed using well known semiconductor techniques and the thickness of the bondline can be easily controlled to within angstroms, if desired. Lateral alignment of the optoelectronic component (e.g. laser 13) and the optical block 18 can then be controlled by any of the well known placement procedures (e.g. various alignment devices, indices and pick-and-place apparatus, etc.).

Thus, new and improved alignment apparatus and methods for optical components in an optical subassembly have been disclosed. The new and improved alignment apparatus and methods require less labor and time in the manufacture of optical subassemblies and improve the fabrication efficiency and manufacturing capabilities of optoelectronic modules and packages. The inclusion of a dielectric layer also improves adhesion between layers to improve reliability of the final package. Further, the new and improved alignment apparatus and method for optical components stabilizes the alignment over wide temperature variations.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

What is claimed is:

1. Optical component alignment apparatus comprising:
   a supporting substrate having a component mounting surface;
   thermally conductive material positioned on a first area of the component mounting surface of the supporting substrate;
   an optoelectronic component positioned on the thermally conductive material, the optoelectronic component defining an optical axis substantially parallel to the component mounting surface of the supporting substrate;
   a conductive layer positioned on the component mounting surface of the supporting substrate adjacent the thermally conductive material;
   a dielectric layer formed on the conductive layer, the conductive layer and the dielectric layer defining a selected bondline thickness; and
   an optical block fixedly positioned on the dielectric layer, the optical block defining an optical axis substantially parallel with the component mounting surface of the supporting substrate, and the bondline thickness being selected to align the optical axis of the optical block with the optical axis of the optoelectronic component.

2. Optical component alignment apparatus as claimed in claim 1 wherein the thermally conductive material includes a heat sink.

3. Optical component alignment apparatus as claimed in claim 1 wherein the optoelectronic component positioned on the thermally conductive material includes a laser.

4. Optical component alignment apparatus as claimed in claim 1 wherein the optical block includes an optical component and an end of an optical fiber.

5. Optical component alignment apparatus as claimed in claim 1 wherein the conductive layer includes one of gold, platinum, and silver.

6. Optical component alignment apparatus as claimed in claim 1 wherein the dielectric layer includes material with a coefficient of thermal expansion matched with a coefficient of thermal expansion of the optical block and the supporting substrate.

7. Optical component alignment apparatus as claimed in claim 1 wherein the dielectric layer includes one of silicon oxide, aluminum oxide, and aluminum nitride.

8. Optical component alignment apparatus as claimed in claim 1 wherein the optical block is fixedly positioned on the dielectric layer by one of epoxy, adhesive, and solder.

9. Optical component alignment apparatus as claimed in claim 1 wherein the supporting substrate includes one of ceramic, semiconductor material, conductive material, and insulative material.

10. Optical alignment apparatus comprising:
    a supporting substrate having a component mounting surface;
    a heatsink positioned on a first area of the component mounting surface of the supporting substrate;
    a light generating component positioned on the thermally conductive material, the light generating component defining an optical axis substantially parallel to the component mounting surface of the supporting substrate along which generated light is emitted;
    a conductive layer positioned on the component mounting surface of the supporting substrate adjacent the thermally conductive material;
    a dielectric layer formed on the conductive layer, the conductive layer and the dielectric layer defining a selected bondline thickness; and
    an optical block fixedly mounted on the dielectric layer, the optical block being designed and positioned to receive light along an optical axis substantially parallel with the component mounting surface of the supporting substrate, the dielectric layer having a coefficient of thermal expansion similar to a coefficient of thermal expansion of the optical block, and the bondline thickness being selected to align the optical axis of the optical block with the optical axis of the light generating component.

11. Optical component alignment apparatus as claimed in claim 10 wherein the light generating component includes a laser.

12. Optical component alignment apparatus as claimed in claim 10 wherein the optical block includes an optical component and an end of an optical fiber.

13. Optical component alignment apparatus as claimed in claim 10 wherein the conductive layer includes one of gold, platinum, and silver.

14. Optical component alignment apparatus as claimed in claim 10 wherein the dielectric layer includes material with a coefficient of thermal expansion matched with a coefficient of thermal expansion of the optical block and the supporting substrate.

15. Optical component alignment apparatus as claimed in claim 10 wherein the dielectric layer includes one of silicon oxide, aluminum oxide, and aluminum nitride.

16. Optical component alignment apparatus as claimed in claim 10 wherein the optical block is fixedly positioned on the dielectric layer by one of epoxy, adhesive, and solder.

17. Optical component alignment apparatus as claimed in claim 10 wherein the supporting substrate includes one of ceramic, semiconductor material, conductive material, and insulative material.

18. A method of mounting and aligning optical components comprising the steps of:
    providing a supporting substrate having a component mounting surface;

positioning thermally conductive material on a first area of the component mounting surface of the supporting substrate;

positioning a light generating component on the thermally conductive material, the light generating component defining a light emitting axis along which generated light is emitted, the light emitting axis being positioned substantially parallel to the component mounting surface of the supporting substrate;

forming a conductive layer on the component mounting surface of the supporting substrate adjacent the thermally conductive material;

forming a dielectric layer on the conductive layer, the conductive layer and the dielectric layer defining a selected bondline thickness;

providing an optical block defining a light receiving axis along which light enters the optical block; and fixedly positioning the optical block on the dielectric layer with the light receiving axis substantially parallel with the component mounting surface of the supporting substrate, and selecting the bondline thickness to align the light receiving axis of the optical block with the light emitting axis of the light generating component.

19. A method as claimed in claim 18 wherein the step of forming the dielectric layer includes forming the dielectric layer of material with a coefficient of thermal expansion matched with a coefficient of thermal expansion of the optical block and the supporting substrate.

20. A method as claimed in claim 18 wherein the step of forming the dielectric layer includes forming the dielectric layer of one of silicon oxide, aluminum oxide, and aluminum nitride.

* * * * *